US012717616B2

(12) United States Patent
Weber et al.

(10) Patent No.: US 12,717,616 B2
(45) Date of Patent: Aug. 25, 2026

(54) TASK-CENTRIC JOB SCHEDULING METHOD AND SYSTEM FOR HETEROGENEOUS CLUSTERS

(71) Applicant: NEC Laboratories Europe GmbH, Heidelberg (DE)

(72) Inventors: Nicolas Weber, Heidelberg (DE); Daniel Thuerck, Heidelberg (DE); Simon Kuenzer, Heidelberg (DE)

(73) Assignee: NEC CORPORATION, Tokyo (JP)

(*) Notice: Subject to any disclaimer, the term of this patent is extended or adjusted under 35 U.S.C. 154(b) by 417 days.

(21) Appl. No.: 18/560,941

(22) PCT Filed: Sep. 13, 2021

(86) PCT No.: PCT/EP2021/075049

§ 371 (c)(1),
(2) Date: Nov. 15, 2023

(87) PCT Pub. No.: WO2022/253451

PCT Pub. Date: Dec. 8, 2022

(65) Prior Publication Data

US 2024/0256333 A1 Aug. 1, 2024

(30) Foreign Application Priority Data

May 31, 2021 (EP) .................................... 21176916

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01); *G06F 9/5044* (2013.01); *G06F 9/505* (2013.01)

(58) Field of Classification Search
CPC .... G06F 9/4881; G06F 9/5038; G06F 9/5044; G06F 9/505; G06F 9/5066;
(Continued)

(56) References Cited

U.S. PATENT DOCUMENTS 10,963,300 B2 3/2021 Champigny
2012/0324472 A1* 12/2012 Rossbach ................ G06F 9/467 718/106
2018/0112983 A1* 4/2018 Ahmed .................. G01C 21/30

FOREIGN PATENT DOCUMENTS

WO WO-2019143774 A1 * 7/2019 ............... G06N 5/01

OTHER PUBLICATIONS

Babaoglu, Ozalp et al.; "Mapping Parallel Computations on to Distributed Systems in Paralex"; *Compeuro'91 Advanced Computer Technology, Reliable Systems and Applications—Proceedings of the 5th Annual European Computer Conference*; May 13, 1991; pp. 123-130; XP010022845; IEEE; Piscataway, NJ, USA.

* cited by examiner

*Primary Examiner* — Craig C Dorais
(74) *Attorney, Agent, or Firm* — Leydig, Voit & Mayer, Ltd.

(57) ABSTRACT

A computer-implemented scheduling method for accelerator hardware includes using a computational graph that splits jobs to be executed by the accelerator hardware into atomic compute tasks, using a scheduler to individually schedule and/or migrate each task for execution to different machines and/or accelerators at job runtime, and using a computer daemon to allocate memory and execute kernels for each task on the respective machines and/or accelerators.

16 Claims, 3 Drawing Sheets

(58) Field of Classification Search
CPC ....... G06F 2209/483; G06F 2209/5017; G06F 2209/508
See application file for complete search history.

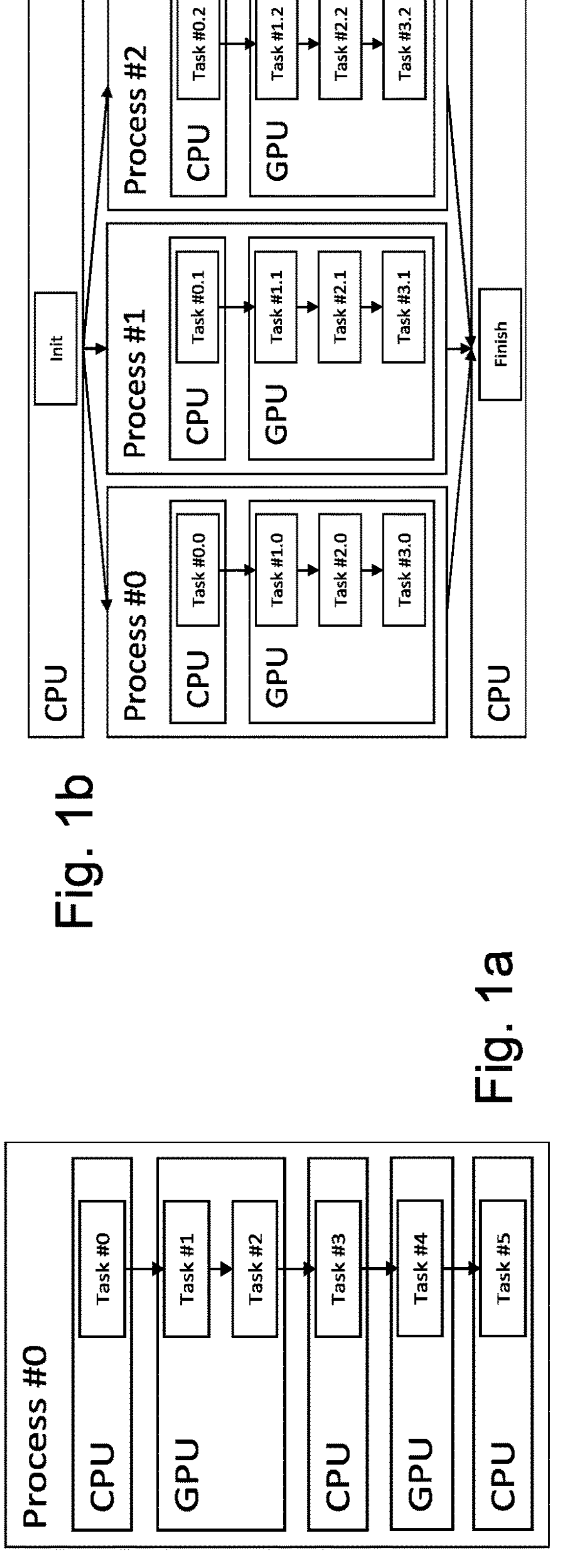
Fig. 1b
Fig. 1a
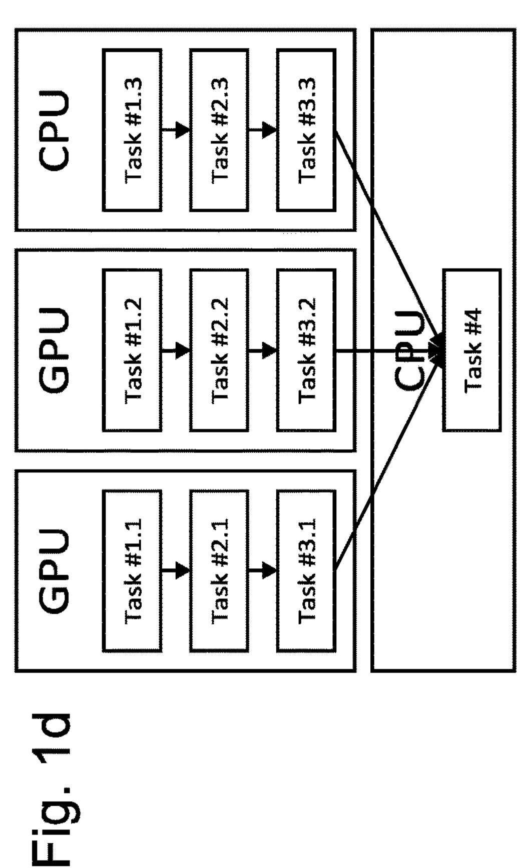
Fig. 1d
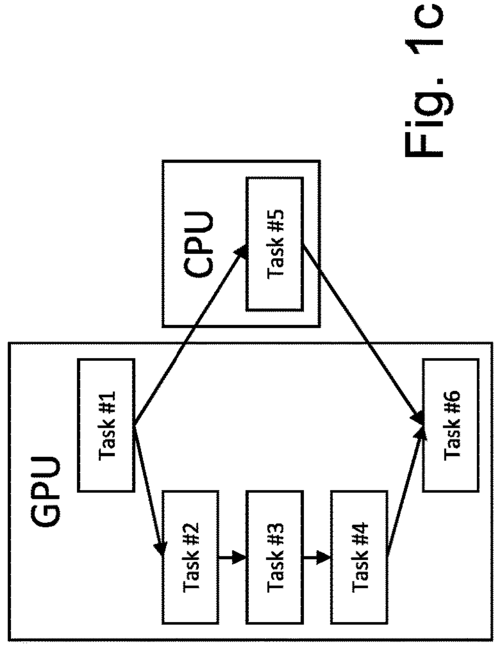
Fig. 1c

TASK-CENTRIC JOB SCHEDULING METHOD AND SYSTEM FOR HETEROGENEOUS CLUSTERS

CROSS REFERENCE TO RELATED APPLICATIONS

This application is a U.S. National Phase application under 35 U.S.C. § 371 of International Application No. PCT/EP2021/075049, filed on Sep. 13, 2021, and claims benefit to European Patent Application No. EP 21176916.1, filed on May 31, 2021. The International Application was published in English on Dec. 8, 2022 as WO 2022/253451 A1 under PCT Article 21(2).

FIELD

The present invention generally relates to a scheduling method and system for accelerator hardware.

BACKGROUND

Today's compute clusters are complex setups of heterogeneous systems of CPUs and various compute accelerator architectures. Users share these expensive setups by submitting "jobs", i.e. scripts that launch one or multiple applications and reserve resources accordingly. In order to benefit from the fast proliferation of compute accelerators (GPUs, vector cards, SIMD registers, FPGAs, Systolic arrays, . . . ), many applications and libraries have been modified to execute parts of their code on such devices. Typically, developers access them through memory transfers, kernel invocations or library calls. In this context, kernels are function calls issued on the host that are processed on an accelerator device ("offloaded") where data resides on that device.

The current state of the art distributed schedulers for compute clusters are not well suited for fine-grained execution patterns and, as such, prevent the cluster from being optimally utilized. For instance, in today's scheduling systems only nodes as a whole together with their accelerators are reserved. If an application only uses one single accelerator but the node offers multiple, the other n−1 will be idling. Furthermore, if execution times vary between processes, machines that were assigned to the shorter-running processes would be idle, but still blocked for the job.

In addition, current state of the art distributed schedulers potentially waste execution time as they expect the user to know best what he needs. There is no automatism for tuning these requirements. In reality, most users of HPC (High Performance Computing) applications have hardly any understanding of the underlying computations, leading to over-reservation of resources. Specifically, if the user does not know a job's memory consumption upfront, ultimately the job will terminate unexpectedly upon exceeding the specified value.

The combination of all issues outlined above lead to two severe issues for users who pay for their computation time and infrastructure operators that want to utilize the offered resources at best: First, this prevents the system to dynamically scale (increase/decrease the number of used cores/accelerators) with the application's needs. During initialization and exit of the application, data is usually loaded/stored, which leaves most nodes idle during these phases. Or, if the workload changes at runtime, e.g., through adaptive mesh adjustments in finite element (FE) simulations, idle nodes cannot be rescheduled to other jobs. Second, idle but reserved time generates cost for both the user who waits for his results as well as the provider who could make better use of idling machines and accelerators for other tasks.

Similar problems occur in cloud environments, although they are more flexible, allowing to share machines to a limited degree through virtualization.

SUMMARY

In an embodiment, the present disclosure provides a computer-implemented scheduling method for accelerator hardware, the method comprising: using a computational graph that splits jobs to be executed by the accelerator hardware into atomic compute tasks; using a scheduler to individually schedule and/or migrate each task for execution to different machines and/or accelerators at job runtime; and using a computer daemon to allocate memory and execute kernels for each task on the respective machines and/or accelerators.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 1*a*-1*d* are diagrams schematically illustrating various possible execution patterns of HPC and machine learning software;

DETAILED DESCRIPTION

Figure 2:
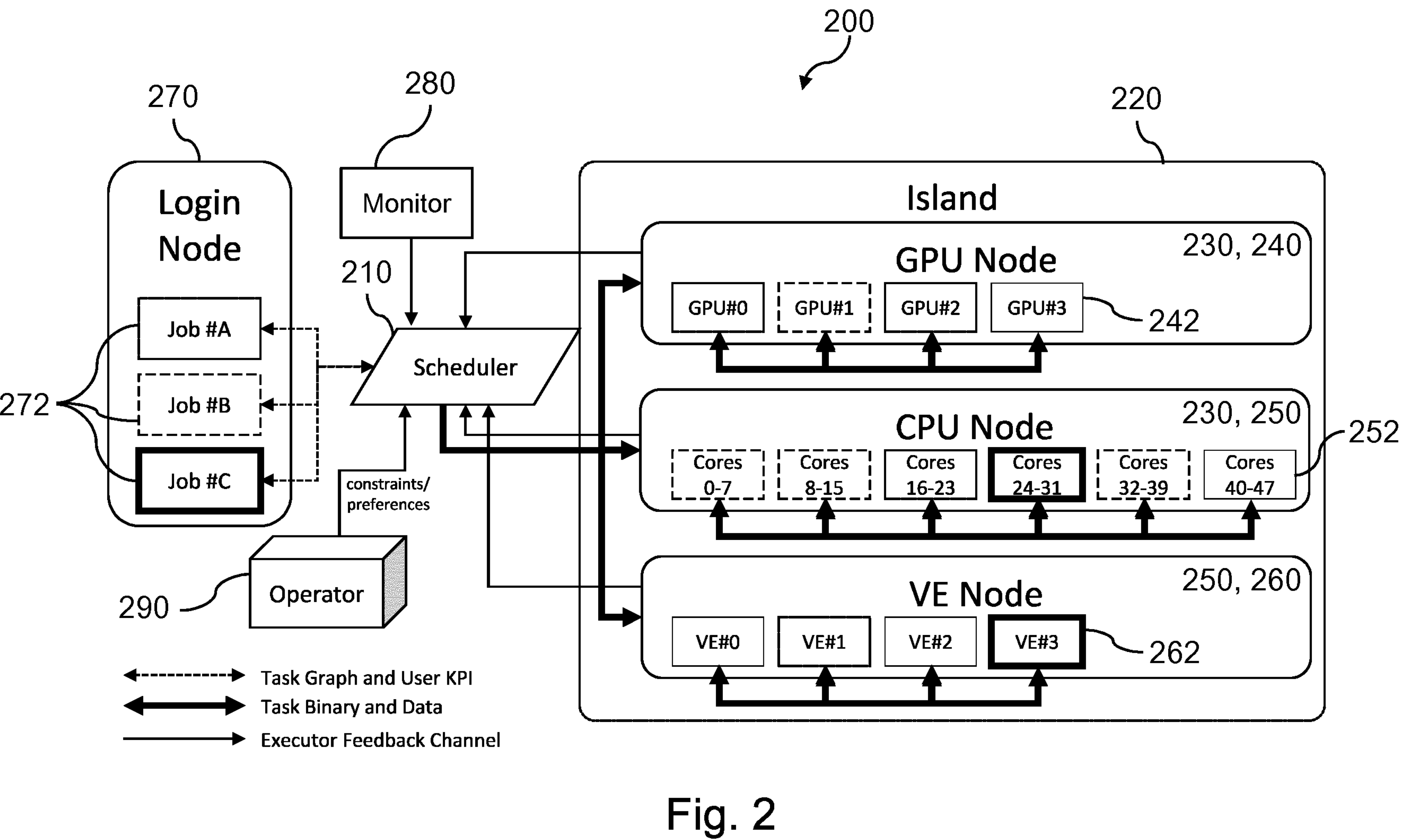
FIG. 2 is a schematic view illustrating a scheduling system in accordance with an embodiment of the present invention.

In accordance with an embodiment, the present invention improves and further develops a scheduling method and system of the initially described type in such a way that an improved utilization of the resources of a hardware infrastructure can be achieved.

In accordance with an embodiment, the present invention provides a computer-implemented scheduling method for accelerator hardware, the method comprising using a computational graph that splits jobs to be executed by the accelerator hardware into atomic compute tasks; using a scheduler to individually schedule and/or migrate each task for execution to different machines and/or accelerators at job runtime; and using a computer daemon to allocate memory and execute kernels for each task on the respective machines and/or accelerators.

Furthermore, in accordance with an embodiment, the present invention provides a scheduling system for accelerator hardware, the system comprising a computational graph configured to split jobs to be executed by the accelerator hardware into atomic compute tasks; a scheduler configured to individually schedule and/or migrate each task for execution to different machines and/or accelerators at job runtime; and a computer daemon configured to allocate memory and execute kernels for each task on the respective machines and/or accelerators.

Embodiments of the present invention provide a highly flexible (online) scheduling methods and system for heterogeneous clusters. Compute resources can be added, removed, or changed at runtime of jobs. Additionally, the invention provides the ability to migrate jobs or parts of jobs between different accelerator hardware types at runtime. To this end, a computational graph is used that splits jobs into atomic tasks where each task can be individually programmed and scheduled for execution on a set of heterogeneous machines and accelerators.

According to embodiments of the invention, multiple jobs may be mapped as levels within the computational graph. As such, jobs may be represented as annotated hierarchies of tasks. The computational graph may be annotated by input and output data buffers for each task, such that data can move with the tasks. As this approach avoids unnecessary synchronization after each job, it offers more flexibility moving tasks around to other compute nodes. In consequence, the model allows for asynchronous handling of tasks with very fine granularity.

In the context of the present disclosure a 'job' denotes a process of a user running on a compute node, e.g. a login node to the scheduling system and that dispatches the compute-kernels as 'tasks'. In other words, in the context of the present disclosure a 'task' denotes a compute-kernel that runs on the machine/accelerator, either directly issued by the hardware (if this is supported) or within a demon process running on a host machine, which passes through the compute-kernel.

It should be noted that the present invention is not limited to clusters. In fact, the entire system can also be run locally on a single node with one or multiple accelerators installed. In this case, the scheduler just needs to run on the local system.

In existing prior art solutions, tasks typically operate on a (virtual) machine level, i.e. entire virtual machines that execute tasks are possibly suspended. Compared to that, the present invention works on a much finer granularity, namely on a process level, so each offloaded task is a process. Therefore, the system according to the present invention is much more lightweight. In addition, prior art system typically require operating system support for this, e.g. a virtualization like qemu. In contrast, according to embodiments, the scheduling system of the present invention is purely user space based.

In the context of the present invention, jobs are capable of adaptively submitting more tasks to the scheduling system. For instance, in a simulation application, it is often unknown how many steps need to be conducted to reach the desired result. As processes, according to embodiments of the invention, are running on the scheduler node, a job can wait for the results of the tasks, analyze if they fulfill certain criteria and, if not, issue more tasks until the desired outcome is achieved.

It should be noted that modern accelerators do not necessarily require a host system to operate. For instance, the NEC SX-Aurora or the upcoming NVIDIA EGX A100 can operate on their own, without being controlled by a host system. Correspondingly, the system according to embodiments of the present invention can work with such hardware setups, in particular in view of the fact that each accelerator can be regarded as a separate compute device that does not necessarily require a host daemon. Of course: for hardware that cannot run on its own, a daemon running on the host system may be utilized to pass through tasks to the accelerator.

According to an embodiment of the present invention, the scheduler is configured to schedule and migrate tasks to different machine and/or accelerators at job runtime. These accelerators may report performance metrics to the scheduler that in turn may base its decision on this data. User or operator provided constraints/preferences can be additionally taken into account (i.e. lowest price, lowest power, best performance).

According to an embodiment of the present invention, user applications/processes (i.e. jobs) may be written by making use of a heterogeneous archive format representing programs by a mix of source code, intermediate representations and/or binaries, all following a common offload API (Application Programming Interface). Elements of this archive may be designed to allow the creation of hardware-specific kernels on all compute nodes, allowing to transparently launch tasks on different classes of accelerator devices.

The present invention takes its most beneficial effect when applied to processes and applications that are suited for task splitting, for instance, long enough computational phases to benefit from executing on accelerators and overhead by task placing.

Embodiments of the present invention provide one or more of the following advantages over existing prior art solutions:

1. Less memory consumption in check-pointing/job suspension when compared to traditional pause/resume/migrate implementations where all job states are saved/restored.
2. Much higher flexibility in allocating/deallocating compute resources in compute clusters, esp. for long running jobs and at the runtime of jobs.
3. Influence on scheduling decisions at runtimes of jobs, based on system monitoring and on optional job or given constraints, preferences, and priorities.
4. Multi-implementation tasks in order to enable dynamic selection between different implementations, e.g., depending on available hardware and/or performance/energy constrains.
5. The ability to transparently migrate tasks of jobs to different classes of hardware and with that, the ability to measure compute time per individual accelerator and include that into the billing process for cloud setups.

There are several ways how to design and further develop the teaching of the present invention in an advantageous way. To this end, it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

FIG. 1 illustrates various possible execution patterns of HPC (High Performance Computation) and machine learning software. While the scenarios of FIGS. 1*a* and 1*b* use the process abstraction as is common for HPC software, the scenarios of FIGS. 1*c* and 1*d* resemble computational graphs that machine learning frameworks use.

In detail, FIG. 1*a* shows a typical execution pattern for "accelerated" software according to prior art. Parts of a computation have been ported to an accelerator device, e.g., a GPU, while some code remains on the CPU. Kernels, which are function calls issued on the host that are processed on the accelerator device ("offloaded"), are abstracted as tasks. Large-scale HPC applications typically go beyond this simple pattern and parallelize their computation on a second layer, over process. Coarser parts of the application are distributed over processes, each using a single GPU. Each process may run on a different cluster node and access some accelerators exclusively. This pattern, which is shown in FIG. 1*b*, is typical for, e.g., finite element simulations.

Fueled by the deep learning boom, machine learning tasks have become another use case for cluster setups. Machine learning frameworks, most notably PyTorch and Tensorflow, organize their computation as a computational graph that specifies both the order of computations and the dataflow involved. The underlying runtime is then free to determine the best execution order. This abstraction would allow more cooperative relationships between CPU and accelerator, as shown in FIGS. 1*c* and 1*d*. However, the current scheduling mechanisms in these frameworks are limited to mapping the computations to patterns setups similar to FIG. 1*a* or 1*b*, falling back to the "classical" HPC methodology.

Furthermore, once a job is submitted, today's HPC scheduling systems (i.e. SLURM or LSF) may require explicit reservation of hardware. For instance, the number of cores, memory, number of machines, accelerators, etc. needs to be specified upfront. These resources are blocked for the entire runtime of the submitted job.

For instance, as an example for a SLURM script, the following listing contains an exemplary job description, reserving 128 CPU cores and 1.75 GB of main memory:

```
#!/bin/bash
#SBATCH -J job_name
#SBATCH --mail-type=END
#SBATCH -e /home/<user>/log.err.%j
#SBATCH -o /home/<user>/log.out.%j
#SBATCH -n 128
#SBATCH --mem-per-cpu=1750
#SBATCH -t 01:30:00
module purge
module load gcc
cd /home/<user>/folder
./app param1 param2 param3
```

After the execution environment is set up, a single application is loaded. There are a number of problems with this approach:

1. If the user does not know the job's memory consumption upfront, ultimately the job will terminate unexpectedly upon exceeding the specified value.
2. If execution times vary between processes in setups similar to FIG. 1*b*, machines that were assigned to the shorter-running processes would be idle, but still blocked for the job. A cluster cannot be optimally utilized.
3. Scheduling systems work on a too coarse granularity. Only nodes as a whole together with their accelerators are reserved. If an application only uses one single accelerator but the node offers multiple, the other n−1 will be idling.
4. Schedulers do not re-consider the placement of jobs while they are running which decreases the number of scheduling opportunities for better infrastructure utilization.

The current state of the art distributed schedulers are not well suited for fine-grained execution patterns like the ones shown in FIGS. 1*c* and 1*d*. They potentially waste execution time as they expect the user to know best what he needs. There is no automatism for tuning these requirements.

In practice, these schedulers were designed for patterns similar to FIG. 1*b*. Process- and Multi-node scheduling is thus left to MPI (the Message passing Interface). MPI allows expressing data transfers and dependencies between different nodes. When an MPI application is launched, each process is assigned a unique ID and data transfers between different nodes are scheduled. However, MPI does not support dynamically adding or removing nodes once the job is launched.

To address these issues, embodiments of the present invention provide scheduling methods and systems by improving the scheduling granularity: Instead of scheduling entire applications or processes, embodiments of the invention propose to schedule compute tasks instead. This results in a change of the scheduling granularity from per-process to per-task. In the context of the present disclosure, the term 'task' refers to single compute-kernel calls dispatched by jobs, i.e. processes running on the host. Jobs can be partly or entirely migrated to different machines and accelerators whenever a compute task finished. A compute task can be provided in different machine formats and/or high-level representations so that it can be executed on different accelerator types and architectures.

Embodiments of the invention provide the option to migrate a task associated with a job or a complete job from one machine/accelerator to another. In an initial step, a job may be split into multiple atomic tasks using various computational methods such as computational graphs. Once the job is divided into multiple tasks, each task may be individually scheduled with the help of a scheduler for execution on a group of heterogeneous machines and accelerators. The scheduler can be used to either schedule or migrate the task between different set of machine and accelerators.

In a next step, the accelerators may form a feedback loop with the scheduler. Through this loop, the scheduler can receive performance feedback from the accelerators on the basis of such feedback the scheduler can make decisions regarding the scheduling and migration of tasks.

In further steps, a programming code may be included in the job, which helps to align the job with the scheduler and makes it easier for the scheduler to schedule and migrate the tasks to different resources. In addition, user preferences may be taken into account on the basis of which the scheduler may form its scheduling decisions regarding the tasks. On the other hand, the scheduler may also use a load balancing system and/or a queueing system to schedule multiple tasks to different sets of machines and accelerators.

FIG. 2 schematically illustrates a scheduling system 200 in accordance with an embodiment of the present invention. The scheduling system comprises a scheduler 210 and at least one compute node 230 including one or more accelerated devices. In the illustrated embodiment, the scheduling system 200 comprises a heterogeneous cluster 220 including three types of compute nodes 230, each containing a different class of processing units (in the following also referred to as "accelerator devices" or simply "accelerators"). Specifically, in the illustrated embodiment one compute node 230 is implemented in form of a GPU node 240 including four graphics processing units 242 (GPU #0-GPU #3), another compute node 230 is implemented in form of a CPU node 250 including six central processing units 252 (Cores), and yet another compute node 230 is implemented in form of a VE node 260 including four vector processing units 262 (VE #0-VE #3).

It should be noted that the compute nodes 230 do not have to be co-located, as shown in FIG. 2, but can be distributed, i.e. being located anywhere in a network while being connected to the scheduler 210.

The scheduling system 200 can be accessed and utilized by a user via the scheduler 210. In FIG. 2, a user is assumed to operate login node 270 on which the user is running one or more processes 272 (in the following also referred to as "jobs"), specifically Job #A, Job #B and Job #C, as shown in FIG. 2. In effect, the accelerators located in the compute nodes 230 somewhere in the network appear as local accelerator devices to the login node 270 and the running process. According to an embodiment of the invention, the scheduler 210 thus virtualizes or actually time multiplexes machines and accelerators.

According to an embodiment of the present invention, the scheduler 210 is configured to take its scheduling decision based on computational graphs of tasks given with a job description. Data buffers may be used to identify the dependencies of each task and when they can be executed. The RAM of the accelerators/machines may be used for communication between the tasks. According to embodiments, the locality of the data determines the accelerator that shall run the task. If the data is located on different accelerators (i.e. if a previous task was run on a different accelerator), the scheduler 210 needs to decide where to run the job and migrate/duplicate data.

According to embodiments of the invention, a job (e.g., one of the processes 272 running on the login node 270 long running in the morning along with) is instrumented in order to cooperate with the scheduler 210. This can be done manually, guided or even fully automated with the compiler tools of the respective job and its tasks (i.e. its compute-kernel calls).

Figure 3:
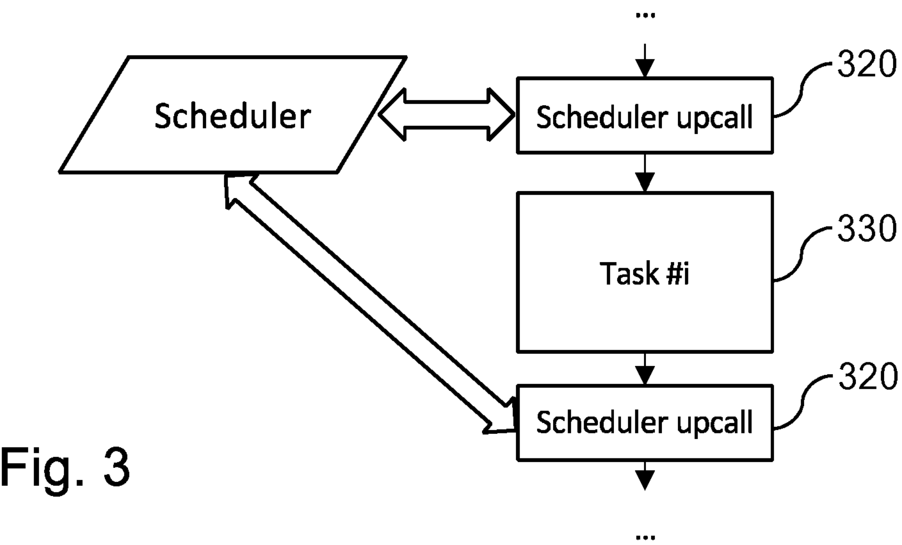
FIG. 3 is a schematic view illustrating instrumentation of a job code in accordance with an embodiment of the present invention.

The instrumentation may add code to a job at those points where a re-decision about the resource can be made. For instance, as shown for the scheduler 310 illustrated in FIG. 3, it may be provided that a scheduler upcall 320 is inserted before and after each atomic task 330 of the job.

Figure 4:
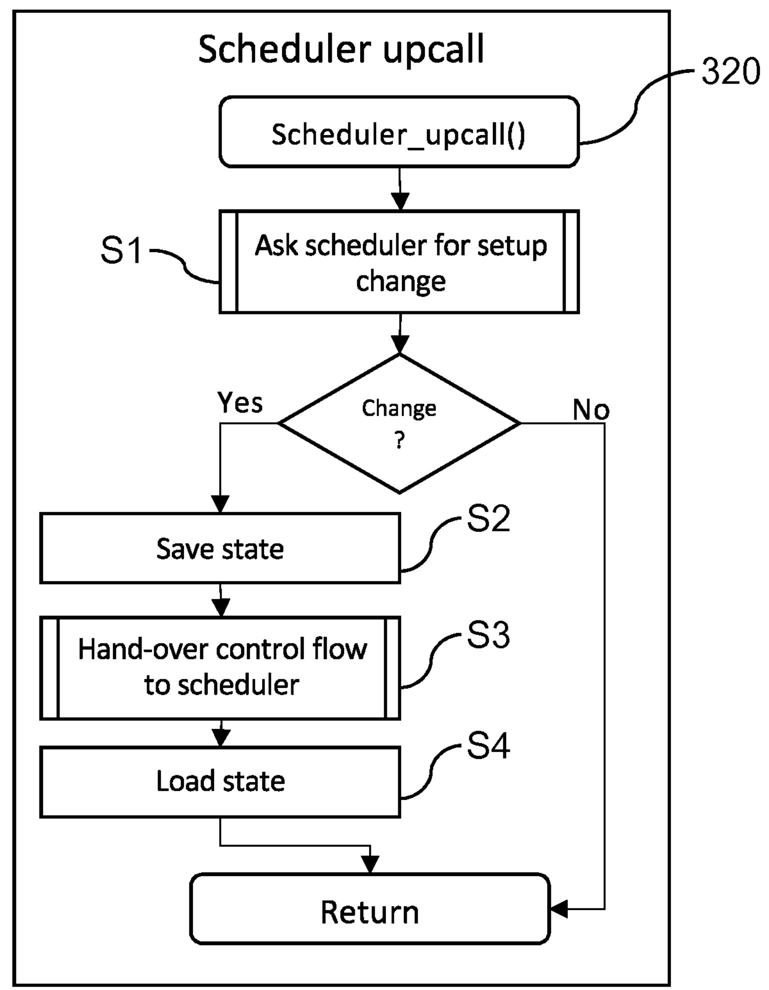
FIG. 4 is a flowchart illustrating an implementation of an instrumentation point in accordance with an embodiment of the present invention.

FIG. 4 illustrates a possible implementation of an instrumentation point in accordance with an embodiment of the present invention. In brief, when the scheduler 310 receives the control flow, it can re-locate the following task to a different location. The control flow then returns on a different hardware. The scheduler 310 is also able to pause the control flow by returning it after the pause finished.

More specifically, as shown in FIG. 4, at such decision points, the responsible scheduler instance may be queried if a change of the execution setup will be done (see step S1). If not, the control flow continues with the next task. In case the scheduler 310 wants to perform an action, the control flow is handed over to the scheduler 310 (as shown at S3) so that the flow can be paused or even migrated to a different hardware. For this purpose, the local computation state data may be saved beforehand (as shown at S2), which may be restored as soon as the control flow continues (as shown at S4). According to embodiments of the invention, for the case when the accelerator hardware type is changed (e.g., with reference to FIG. 2, the respective task is switched from a processing unit 242 of GPU node 240 to a processing unit 252 of CPU node 250), the "save state"-"load state" pair may take care of the inter-architecture migration of the local computation state.

Referring again to FIG. 1, according to embodiments of the present invention, the scheduling system 200 may further comprise a performance monitoring component 280. The monitoring component 280 may be configured to create, for instance through static analysis, an initial estimation of the performance. In particular, it can be determined if a task is either compute- or memory-bound and, based on that, a suitable accelerator of the compute nodes 230 of the cluster 220 can be selected.

However, execution performance is often input data sensitive, so that the choice of the scheduler 210 to run the tasks, for instance on GPUs 242, might not necessarily yield in optimal performance. To this end, according to embodiments of the invention commit may be provided that each accelerator monitors its own performance counters. In case the utilization is bad, e.g. below certain configurable performance thresholds, a respective accelerator may signal the scheduler 210 to move a task to another accelerator type. Depending on availability, the following tasks then can be migrated.

According to a further embodiment of the invention, it may be provided that additional execution constraints and/or preferences can be attached to a job, either by an infrastructure operator 290 or by the respective job owner. These constraints/preferences can further influence scheduling decisions, e.g., for reducing a jobs computation time (all available and needed accelerators assigned to the job) or best utilization of the infrastructure (as many jobs as possible executed in parallel). In a cloud scenario, the goals could be linked to cost charging for a job execution.

The scheduling system 200 according to embodiments of the invention provides several degrees of freedom. In detail:

1. Accelerators can be dynamically added, removed, or changed from a job execution. If the cluster 220 needs to give resources to a higher priority job, the scheduler 210 may interrupt the execution after a task, transfer all data to another machine and/or accelerator, disk storage, etc. and then re-assign the freed accelerators.
2. Machines and accelerators that run out of tasks can immediately be reused for tasks of other jobs.
3. Jobs can be entirely suspended by check pointing all data between the job's tasks.
4. Read-only data used in multiple parallel tasks can efficiently be duplicated, and also simply freed if not longer needed.

According to an embodiment, the present invention provides a scheduling system including one or more of the following steps/components:

1. A compute cluster of at least one node.
2. A scheduling daemon, in particular configured as described above in connection with FIG. 2.
3. A compute daemon for each launched process running on the target machines, used to allocate memory and execute kernels for the given process.
4. The user application being written with a common offloading API whose elements allow the creation of hardware-specific kernels on all compute nodes and being packed into an archive with some form of the program included for each accelerator architecture in use.
5. The scheduling daemon introduced at 2. uses a work balancing/queueing system for distributing the workloads onto the different machines that it is controlling.

According to an application scenario, a scheduling system according to the present invention may be applied in connection with the computation of simulations, in particular finite element (FE) simulations. In simulation applications one usually has a mesh for the simulation, where each accelerator computes the simulation on a local mesh. Further, these share data between neighbouring mesh-cells after each simulation step. On top, many simulations use data shared between all accelerators, i.e. for chemical lookup tables. The workload itself is very structured, doing the same computations in every simulation step (as generally shown in FIG. 1*b*).

More complicated is, if the used mesh gets refined. In this case queues would stay empty or would be reorganized, which can be covered by a scheduling system according to embodiments of the invention. For instance, according to an embodiment it may be provided that a mesh that gets coarsened is being destroyed, and just new parallel tasks are created at runtime. In terms of FIG. 1*b*, reorganizing the mesh would mean spawning new processes.

According to an application scenario, a scheduling system according to the present invention may be applied in connection with neural network training. Neural network training is a data parallel task, where the neural network has parameters that are shared with all nodes.

The normal procedure is to load a so called MiniBatch that is copied to the target device. This runs the forward pass of the neural network. Next, the loss function gets computed and the backward pass gets executed. This backward pass computes gradients for all of the parameters, which then are used to update these.

Depending on the training mode storing the parameters in global or grouped memory makes sense. Global memory, when after each iteration all parameters are updated. However, for bigger models usually the gradients are used to update the parameters of a smaller group first, and then only after a predefined number of iterations, these are synchronized globally.

According to an embodiment of the present invention, a scheduling system according to the present invention could be applied in connection with software-as-a-service setups, where the scheduler would improve the fine-grained usage and billing of compute resources and thus lower the barrier to adapt heterogeneous computing in the cloud sector.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented scheduling method for accelerator hardware, the method comprising:

using a computational graph that splits jobs to be executed by the accelerator hardware into atomic compute tasks;

using a scheduler to individually schedule and/or migrate each task for execution to different machines and/or accelerators at job runtime; and using a computer daemon to allocate memory and execute kernels for each task on the respective machines and/or accelerators.

2. The method according to claim 1, wherein a job to be executed is a process running on a login node of a user, and wherein tasks of the job are compute-kernel calls dispatched by the job.

3. The method according to claim 1, wherein the computational graph specifies both an order of computations and a dataflow involved.

4. The method according to claim 1, further comprising:

reporting, by the machines and/or accelerators, performance metrics to the scheduler, wherein the scheduler takes the received performance metrics reports into consideration for scheduling decisions.

5. The method according to claim 1, wherein the scheduler takes execution constraints and/or preferences provided for a job by an infrastructure operator or a job owner into consideration for scheduling decisions.

6. The method according to claim 1, wherein a compute task is provided in a number of different machine formats and/or high-level representations.

7. The method according to claim 1, wherein the jobs to be executed are instrumented in order to cooperate with the scheduler.

8. The method according to claim 7, wherein the instrumentation includes adding code for the scheduler upcall to a job, wherein the code is inserted at points where the scheduler can perform an action.

9. The method according to claim 1, further comprising:

indicating, by the scheduler at an instrumentation point, an intention to perform a scheduling decision concerning a task;

saving a local computation state data of the task;

handing over control flow of the task to the scheduler for execution of the scheduling decision; and restoring the local computation state data of the task as soon as the control flow continues after execution of the scheduling decision.

10. The method according to claim 1, further comprising utilizing elements of a heterogeneous archive format for creating hardware-specific kernels on all compute nodes of the accelerator hardware, wherein the archive format represents programs by a mix of source code, intermediate representations and/or binaries following a common offload API.

11. A scheduling system for accelerator hardware, the system comprising:

a computational graph configured to split jobs to be executed by the accelerator hardware into atomic compute tasks;

a scheduler configured to individually schedule and/or migrate each task for execution to different machines and/or accelerators at job runtime; and a computer daemon configured to allocate memory and execute kernels for each task on the respective machines and/or accelerators.

12. The system according to claim 11, wherein a job to be executed is a process running on a login node of a user, and wherein tasks of the job are compute-kernel calls dispatched by the job.

13. The system according to claim 11, further comprising a work balancing and queueing component for distributing workloads onto the different machines and/or accelerators.

14. The system according to claim 11, further comprising a monitoring component configured to create performance metrics and to report the performance metrics to the scheduler, wherein the scheduler is further configured to take the received performance metrics reports into consideration for scheduling decisions.

15. The system according to claim 11, wherein the accelerator hardware comprises a heterogeneous cluster including a number of types of compute nodes, each containing a different class of machines and/or accelerator devices.

16. The method according to claim 8, wherein the action is performed before and after each atomic task.

* * * * *